US007216287B2

(12) United States Patent
Colson et al.

(10) Patent No.: US 7,216,287 B2
(45) Date of Patent: May 8, 2007

(54) PERSONAL VOICE PORTAL SERVICE

(75) Inventors: Vicki L. Colson, Deerfield Beach, FL (US); Thomas E. Creamer, Boca Raton, FL (US); Brent L. Davis, Deerfield Beach, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 10/211,155

(22) Filed: Aug. 2, 2002

(65) Prior Publication Data

US 2004/0205475 A1 Oct. 14, 2004

(51) Int. Cl.
- *G06F 17/00* (2006.01)
- *G06F 17/24* (2006.01)
- *G06F 15/16* (2006.01)
- *G10L 21/00* (2006.01)

(52) U.S. Cl. ............ 715/500; 715/513; 715/523; 704/270.1; 709/203; 709/217

(58) Field of Classification Search ......... 704/206, 704/270.1; 370/352; 709/231, 203, 217, 709/219, 226; 715/500, 501.1, 513, 514, 715/523

See application file for complete search history.

(56) References Cited

U.S. PATENT DOCUMENTS

| 5,351,276 | A |   | 9/1994 | Doll, Jr. et al. ............ 379/67 |
| 5,799,063 | A |   | 8/1998 | Krane .................... 379/67 |
| 5,884,262 | A |   | 3/1999 | Wise et al. .............. 704/270 |
| 5,884,266 | A | * | 3/1999 | Dvorak .................. 704/270.1 |
| 5,915,001 | A |   | 6/1999 | Uppaluru ................ 379/88.22 |
| 5,945,989 | A |   | 8/1999 | Freishtat et al. ......... 345/329 |
| 5,953,392 | A |   | 9/1999 | Rhie et al. ............ 379/88.13 |
| 6,052,367 | A |   | 4/2000 | Bowater et al. .......... 370/352 |
| 6,101,472 | A | * | 8/2000 | Giangarra et al. ........ 704/275 |
| 6,101,473 | A |   | 8/2000 | Scott et al. ............ 704/275 |
| 6,115,686 | A | * | 9/2000 | Chung et al. ........... 704/260 |

(Continued)

FOREIGN PATENT DOCUMENTS

EP    0883313    12/1998

(Continued)

OTHER PUBLICATIONS

Mitchell Krell, V-Lynx: bringing the World Wide Web to sight impaired users, 1996, ACM Press, pp. 23-26.*

(Continued)

*Primary Examiner*—William Bashore
*Assistant Examiner*—Maikhanh Nguyen
(74) *Attorney, Agent, or Firm*—Akerman Senterfitt

(57) ABSTRACT

A method of deriving audio content from visual content can include modifying a visual markup language document requested by a client computer system to specify a control for generating an audio markup language document version of the visual markup language document. The modified visual markup language document can be provided to the client computer system. Responsive to a selection of the control, an audio markup language document version of the visual markup language document can be generated. The audio markup language document can be saved for subsequent presentation through an audio interface.

19 Claims, 3 Drawing Sheets

U.S. PATENT DOCUMENTS

| | | | |
|---|---|---|---|
| 6,125,376 A * | 9/2000 | Klarlund et al. | 715/513 |
| 6,208,839 B1 | 3/2001 | Davani | 455/31.3 |
| 6,212,199 B1 * | 4/2001 | Oxford | 370/466 |
| 6,226,285 B1 * | 5/2001 | Kozdon et al. | 370/352 |
| 6,240,448 B1 | 5/2001 | Imielinski et al. | 709/218 |
| 6,243,443 B1 | 6/2001 | Low et al. | 379/88.17 |
| 6,263,051 B1 * | 7/2001 | Saylor et al. | 379/88.17 |
| 6,269,336 B1 * | 7/2001 | Ladd et al. | 704/270 |
| 6,275,833 B1 | 8/2001 | Nakamura et al. | 707/513 |
| 6,282,281 B1 | 8/2001 | Low | 379/230 |
| 6,304,753 B1 | 10/2001 | Hartmaier | 455/413 |
| 6,314,402 B1 * | 11/2001 | Monaco et al. | 704/275 |
| 6,400,806 B1 * | 6/2002 | Uppaluru | 379/88.02 |
| 6,557,026 B1 * | 4/2003 | Stephens, Jr. | 709/203 |
| 6,569,208 B2 * | 5/2003 | Iyer et al. | 715/513 |
| 6,581,103 B1 * | 6/2003 | Dengler | 709/231 |
| 6,587,822 B2 * | 7/2003 | Brown et al. | 704/275 |
| 6,591,280 B2 * | 7/2003 | Orr | 715/513 |
| 6,766,298 B1 * | 7/2004 | Dodril et al. | 704/270.1 |
| 6,823,311 B2 * | 11/2004 | Tetsumoto | 704/270.1 |
| 6,912,691 B1 * | 6/2005 | Dodrill et al. | 715/513 |
| 2001/0011302 A1 | 8/2001 | Son | 709/225 |
| 2001/0012350 A1 | 8/2001 | Ehlinger | 379/196 |
| 2001/0013001 A1 * | 8/2001 | Brown et al. | 704/270.1 |
| 2001/0014861 A1 | 8/2001 | Oh | 704/270.1 |
| 2001/0018353 A1 | 8/2001 | Ishigaki | 455/566 |
| 2002/0165874 A1 * | 11/2002 | Orr | 707/501.1 |
| 2002/0174147 A1 * | 11/2002 | Wang et al. | 707/513 |
| 2003/0007609 A1 * | 1/2003 | Yuen et al. | 379/88.16 |
| 2003/0182124 A1 * | 9/2003 | Khan | 704/270.1 |
| 2004/0205614 A1 * | 10/2004 | Keswa | 715/523 |

FOREIGN PATENT DOCUMENTS

| | | | |
|---|---|---|---|
| EP | 1100013 | * | 5/2001 |

OTHER PUBLICATIONS

K. Kemble, "Voice-Enabling Your Web Sites", IBM Voice Systems, Jun. 30, 2001, pp. 1-4.*

M. Brown et al., "Web Page.Analysis for Voice Browsing," Workshop on Web Document Analysis, Sep. 8, 2001, pp. 59-61.*

K. Christian et al., "A comparison of voice controlled and mouse controlled web browsing," ACM, Nov. 2000, pp. 72-79.*

S. G. Hild et al., "Application Hosting For Pervasive Computing," IBM System Journal, vol. 40, No. 1, 2001, pp. 193-219.*

J. Freire et al., "WebViews: Accessing Personalized Web Content and Services," ACM, May 2001, pp. 1-21.*

C. Boulton, *Internet News: Big Blue: Talk With A Web Site Via Phone*, sa.internet.com, <http://southafrica.internet.com/InternetNews/IntArc/01/07/23.htm>, (Oct. 17, 2001).

D. Houlding, VoiceXML and The Voice-Driven Internet, *Dr. Dobb's Journal*, <http://www.ddj.com/articles/2001/0104/0104g/0104g.htm>, (Apr. 2001).

VoiceXML For Speech Activated Information Retrieval, *XML—The Site*, <http://www.softwareag.com/xml/library/voicexml.htm>, (Oct. 17, 2001).

Voice Systems, Enterprise Voice Mobile Solutions, Information Access, Anytime, Anywhere Using a Mobile Internet Device, *IBM Corporation*, <http://222-4.ibm.com/software/speech/enterprise/ms_0.html>, (Oct. 17, 2001).

* cited by examiner

PERSONAL VOICE PORTAL SERVICE

BACKGROUND OF THE INVENTION

1. Technical Field

This invention relates to the field of accessing information via an audio interface over a communications network, and more particularly, to voice-enabling visual content.

2. Description of the Related Art

A significant amount of the content available over the Internet is visual in nature. For example, text documents, and more significantly, visual markup language documents such as Hypertext Markup language (HTML) documents are accessed through visual browsers. Users desiring access to Internet content when traveling or when away from a stationary computer system typically access content through Internet-enabled portable communications devices having a visual display. The displays on such portable communications devices, however, traditionally are very small. In consequence, viewing and interacting with visual content as displayed on a portable communications device can be troublesome.

Recently, developers have embraced audio interfaces as a viable alternative to visual displays in portable communications devices. An audio interface typically requires less space to implement within a device than a visual display. Additionally, audio interfaces provide a natural interface through which inexperienced computer users as well as physically challenged users can interact.

The shift toward audio interfaces has lead to increased efforts to provide audio content in a format suitable for presentation through an audio interface. Audio content often is generated by content providers and/or service providers either by creating new audio content or by converting existing visual content to a format suitable for use with an audio interface. For example, content providers can generate Voice Extensible Markup Language (VoiceXML) document versions of HTML documents. This process can be performed manually or can be performed automatically using a transcoding tool such as WebSphere® Transcoding Publisher available from International Business Machines Corporation of Armonk, New York.

Although service or content providers may attempt to account for user preferences, users do not have the capability to select with particularity the content that should be available in an audio format. Moreover, determinations as to the type of audio content that will be made available frequently are unilateral on the part of service or content providers. As the user can access only that audio content which the service provider has chosen to make available to its subscribing users, users are limited to a small subset of the visual content that is presently available over the Internet. Thus, if a particular content provider does not offer audio versions of particular Web pages, users may be forced to acquire audio content from a source different from that which the user typically obtains trusted visual content.

SUMMARY OF THE INVENTION

The present invention provides a solution for voice-enabling visual content for presentation through an audio interface. In particular, using the present invention, users can select which content is to be made accessible through a communications device equipped with an audio interface. Visual markup language documents can be modified to include a control mechanism that can be activated by a user when the visual markup language document is presented on the user's display. Activation of the control mechanism can cause the visual markup language document to be converted to a format suitable for presentation through an audio interface. The resulting audio markup language document can be saved for retrieval at a later time.

The present invention allows users to select content to be made available for audio interfaces from content that previously was available only through a visual browser. In consequence, physically challenged users, inexperienced computer users, as well as any other user desiring access to an audio version of particular visual content can access the audio content using a communications device having an audio interface.

One aspect of the invention can include a method of deriving audio content from visual content. The method can include modifying a visual markup language document requested by a client computer system to specify a control for generating an audio markup language document version of the visual markup language document. The control can be, for example, an activatable icon as well as a speech selectable activatable icon. The modified visual markup language document can be provided to the client computer system. Responsive to a selection of the control, an audio markup language document version of the visual markup language document can be generated. The audio markup language document can be saved for subsequent presentation through an audio interface. Accordingly, the audio markup language document or content specified by the audio markup language document can be provided to a communications device having an audio interface.

The method also can include modifying the visual markup language document to specify at least one selectable marker associated with a section of the visual markup language document. Responsive to a selection of the at least one selectable marker, the associated section of the visual markup language document can be excluded from the generating step. For example, the associated section of the visual markup language document such as an image or text can be excluded from the resulting audio markup language document.

According to another embodiment of the invention, the method can include modifying the visual markup language document to specify at least one marker specifying a text label. The marker and text label can be associated with a section of the visual markup language document. During the generating step, the text label can be associated with a section of the audio markup language document. Notably, the associating step can render the text label as a selectable speech label for requesting playback of the section of the audio markup language document.

The method further can include modifying the visual markup language document to specify at least one marker specifying a text label. The marker can be associated with a field for receiving text in the visual markup language document. During the generating step, the text label can be associated with a section of the audio markup language document corresponding to the field of the visual markup language document. The associating step can render the text label as a selectable speech label specifying that speech is to be used as an input to the section of the audio markup language document.

Another aspect of the invention can include a visual browser including a selectable control for sending a request to a computer system within a computer communications network. The selectable control can cause the generation of an audio markup language document version of a visual markup language document being displayed by the visual browser.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention provides a solution for voice-enabling visual content for presentation through an audio interface. In particular, using the present invention, users can select which content is to be made available through a communications device equipped with an audio interface. Visual markup language documents (MLD) can be modified to include one or more control mechanisms which can be activated by users when the visual MLD is presented. Activation of the control mechanisms can cause the visual MLD to be converted to a format suitable for presentation through an audio interface, for example an audio MLD. The controls also allow the user to specify visual content which is to be excluded from the resulting audio MLD as well as assign text to serve as speech labels for accessing audio content and providing information to be used within a form or query. The resulting audio MLD can be saved for retrieval at a later time.

Figure 1:
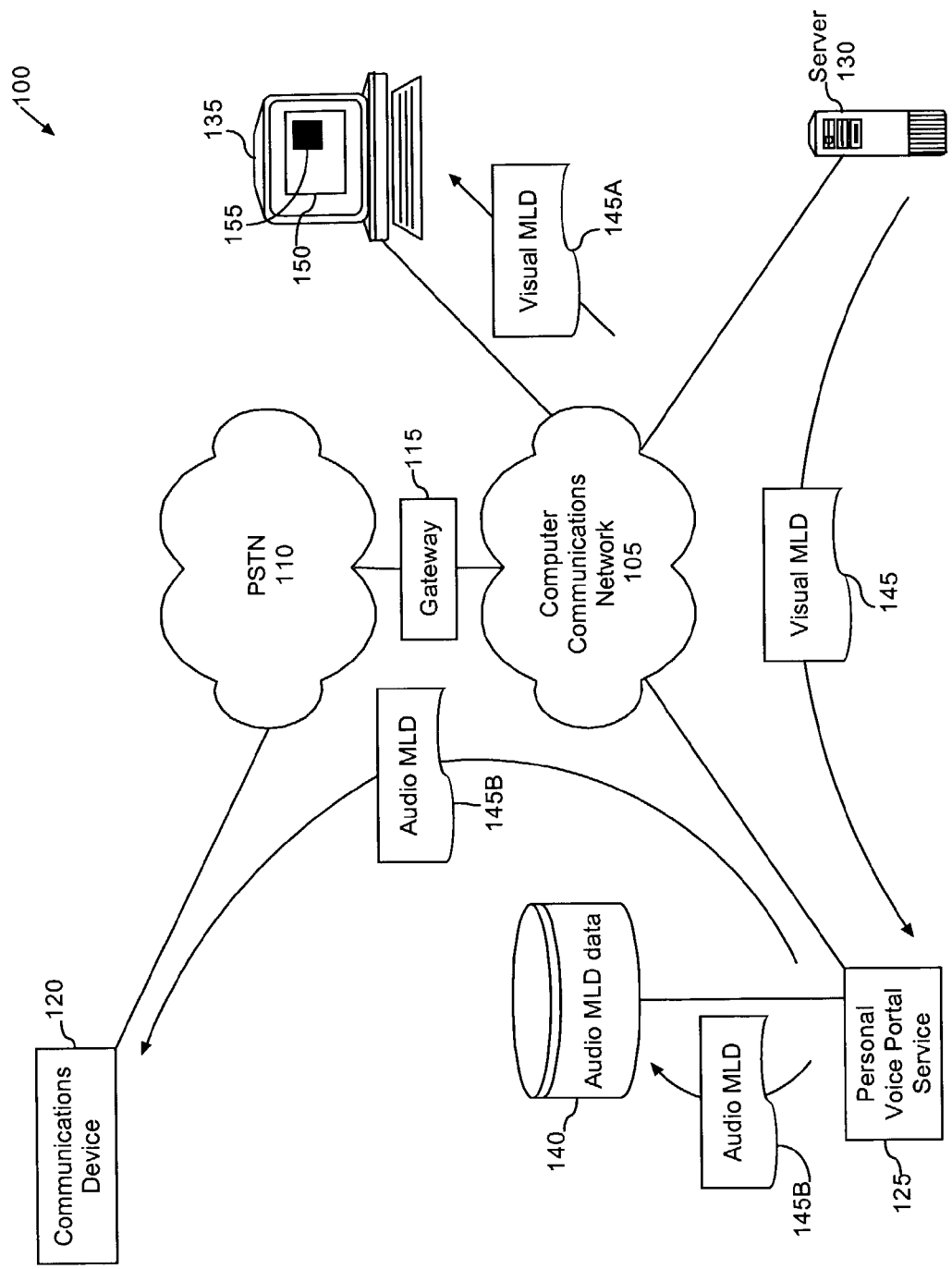
FIG. 1 is a schematic diagram illustrating a system for voice enabling selected visual content over a computer communications network according to the inventive arrangements disclosed herein.

FIG. 1 is a schematic diagram illustrating a system 100 for voice enabling selected visual content over a computer communications network according to the inventive arrangements disclosed herein. As shown in FIG. 1, the system 100 can include a computer communications network 105, a public switched telephone network (PSTN) 110, and a gateway 115 such as a Voice over IP (VoIP) gateway for communicatively linking the computer communications network 105 and the PSTN 110. The computer communications network 105 can include the Internet, a wide area network (WAN), a local area network (LAN), or other suitable data network. The PSTN 110 can include one or more telephony switching systems through which telephone calls can be routed. Accordingly, the PSTN 110 can provide connectivity to the communications device 120.

The communications device 120 can include wireless telephones, portable computing devices, conventional landline telephones, or any other device which can be voice-enabled or include an audio interface, and establish a connection, whether wireless or via a hard link, with the PSTN 110 or the computer communications network 105. Accordingly, although not shown, the PSTN can include wireless communications networks which may be necessary to provide connectivity to the various types of communications devices 120 which can be used with the present invention.

The system 100 can include a personal voice portal service (PVPS) 125, a content server 130, and a computer system 135, each being communicatively linked to the computer communications network 105. The server 130, for example a Web server, can include a variety of different content. The server 130 can include text documents, extensible markup language (XML) documents, visual markup language documents such as Hypertext Markup Language (HTML) documents, or other markup language documents to be presented visually, for example within a browser.

The PVPS 125 can be implemented as one or more computer systems or servers. The PVPS 125 can include a registry of authorized users such that one or more of the users can log onto the PVPS 125 through computer systems such as computer system 135. The PVPS 125 also can include an audio content generator for generating audio MLD versions of visual MLDs. For example, the audio content generator can utilize transcoding technology to generate the audio MLDs from underlying visual MLDs. According to one embodiment of the present invention, the PVPS 125 can analyze an XML or HTML document and generate a VoiceXML analog of the XML or HTML document.

The PVPS 125 can parse an XML document or a visual MLD to identify various sections of the visual MLD such as text sections, headings, images, selectable icons, hyperlinks, data entry fields, or other structures including lists, tables, and the like. The PVPS 125 can modify the visual MLD by including appropriate code and/or tags specifying a control such as an activatable icon to be displayed with the visual MLD. The activatable icon can initiate the generation of an audio MLD version of the visual MLD. Additionally, the PVPS 125 can modify the visual MLD by including code and/or tags which cause the various text, images, data entry fields, hyperlinks, selectable icons, and other structures within the visual MLD to be highlighted or visually distinguished when displayed. Activation of the visual markers can perform one of a variety of functions such as assigning a speech label to the item or excluding the portion of the visual MLD to which the marker pertains from the process of generating a corresponding audio MLD.

The PVPS 125 can be communicatively linked to a data store 140. The data store 140, which can be incorporated into the PVPS 125 or can be a distributed data store located elsewhere in the computer communications network 105, can include the audio MLDs generated by the PVPS 125. For example, when an audio MLD is generated from an underlying visual MLD, the resulting audio MLD can be stored within the data store 140. Notably, the audio MLD can be associated with the particular user who requested that the content be made available as an audio MLD. For example, the audio MLD can be associated with a user profile or other set of user-related attributes which can be accessed when the user logs on to the PVPS 125.

In operation, through the computer system 135, a user can establish a connection with the computer communications network 105, for example using transaction control protocol/Internet protocol (TCP/IP). From the computer system 135, the user can log onto the PVPS 125 using suitable security protocols such as a user name and password.

Having logged onto the PVPS 125, the user can initiate a request for content. For example, the computer system 135 can initiate a hypertext transfer protocol (HTTP) request. The PVPS 125 can receive the request and retrieve the corresponding visual MLD 145 from the server 130. Upon receiving the visual MLD 145, the PVPS 125 can modify the visual MLD 145 as previously noted by including various content markers and controls for initiating the generation of an audio MLD version of the visual MLD 145. The resulting modified visual MLD 145A can be provided to the computer system 135. Those skilled in the art will recognize that content can be stored as an XML document which can be transcoded to any of a variety of other markup language documents, for example, using style sheets. Thus, the requested content can exist as an XML documnet, and during or after transcoding of the XML document, the aforementioned modifications can be included in the resulting visual markup language document.

Thus, a browser 150 operating within the computer system 135 can present the modified visual MLD 145A. As shown, a control 155 can be displayed as part of the visual MLD 145A. The user can select the control 155, for example using a pointer or speech input, thereby initiating the computer system 135 to send a request to the PVPS 125. If the user selects the control 155 using speech input, then the computer system 135 can be equipped with audio receiving capability and the PVPS 125 can include speech recognition capability. Regardless, responsive to receiving the request, the PVPS 125 can generate an audio MLD 145B. As mentioned, the audio MLD 145B is an audio version of the visual MLD 145. The PVPS 120 can store the resulting audio MLD 145B within the data store 140 for later retrieval by the user.

For example, the user can connect to the PSTN 110 using the audio-enabled communications device 120 such as a telephone. Once connected, for example by dialing an access number and providing identifying information, the PVPS 125 can access the user's profile and stored audio MLDs such that the user can request presentation of the audio MLD 145B. Accordingly, the PVPS 125 can access the requested audio MLD 145B from the data store 140 and send the audio MLD 145B to the gateway 115. As the gateway 115 serves as an interface between the data network and the telephony network, the gateway 115 can interpret the audio MLD 145B and deliver audio to the communications device 120 via the PSTN 110. The communications device 120 then can play the received audio. Thus, the user can listen to a rendition of the audio MLD 145B through a speaker and provide further responses or perform further querying by speaking into a microphone of the communications device 120. The gateway 115 can perform any necessary speech-text-processing of the user responses or queries.

According to another embodiment of the present invention, an audio-enabled communications device can establish a connection to the computer communications network 105. The audio MLD 145B can be sent to the communications device 120 or to an online voice browser. If the audio MLD 145B is sent to the communications device 120, the voice browser can be included within the communications device 120 to process the audio MLD. Otherwise, audio data can be received by the communications device 120 from an online voice browser.

Figure 2:
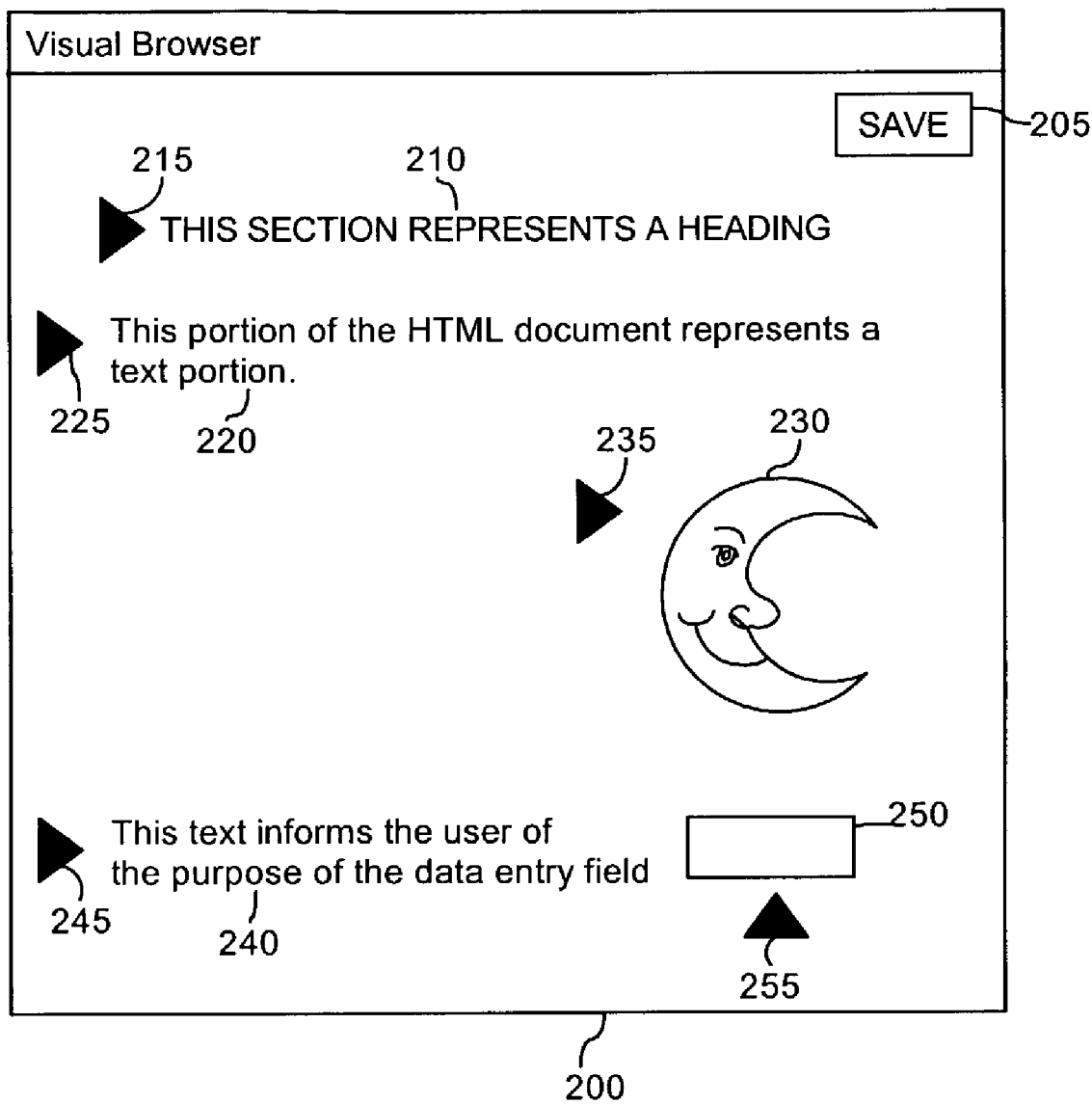
FIG. 2 is a schematic diagram illustrating an exemplary modified visual markup language document in accordance with the inventive arrangements disclosed herein.

FIG. 2 is a schematic diagram illustrating an exemplary modified visual markup language document in accordance with the inventive arrangements disclosed herein. As shown, a browser window 200 can present a visual MLD. In accordance with the inventive arrangements disclosed herein, the visual MLD has been parsed to identify various sections 210, 220, 230, 240, and 250 of the visual MLD. Additionally, markers and/or controls 205, 215, 225, 235, 245, and 255 have been included within the visual MLD. That is, the visual MLD has been modified to include additional code and/or tags for specifying the markers and controls.

Activatable icon 205 is a "save" button. Activation of icon 205 initiates a request to the PVPS requesting that an audio MLD version of the visual MLD be generated and saved. Text 210 has been identified by the PVPS as a heading; and accordingly, the PVPS has included a marker 215 for selecting the text 210. Notably, selection of marker 215, as well as any other marker, can cause the associated section, in this case text 210, to be excluded from the resulting audio MLD. In other words, the audio MLD version of the visual MLD will include no reference to the text 210.

Text 220 has been identified by the PVPS as normal text. Accordingly, the PVPS has included a marker 225 for indicating that text 220 should not be included in the audio MLD. Image 230 has been identified by the PVPS as a graphic or image and as such has been provided a marker 235. Activation of marker 235 indicates that the image 230 should not be included in the audio MLD.

Text 240 has been identified by the PVPS and associated with a marker 245. Activation of the marker 245 indicates that the text 240 should not be included within the audio MLD. Data entry field 250 has been identified by the PVPS and also has been associated with a marker 255. Activation of marker 255 can indicate that the data field 250, or speech receiving capability associated with the functionality of the data field 250, should not be included within the audio MLD.

The various markers can be toggle type switches which can be either activated or deactivated. Notably, additional controls can be included for performing a variety of other functions. For example, a marker can be associated with a data field wherein the marker specifies a text label associated with the data field. The text label can be determined from an analysis of the visual MLD. Selection of the marker can cause the text specified by the marker to be used as a speech label for accessing the data field. Saying the speech label when executing the audio MLD indicates that speech is to be used as input to a data field, a query, or a form.

In illustration, if the visual MLD being displayed corresponds to an auction Web page and data field 250 is for receiving bids, marker 255 can be a tag specifying the text label "BID". The marker 255 can be placed proximate to the data entry field 250. The text of the marker 255 can be derived from an analysis of the markup language document, for example by parsing code and/or tags or processing a text label such as text 240. If the user selects the marker 255, the text label "BID" can be used as a speech label within the resulting audio MLD. Thus, when the user accesses the audio MLD, the user can say "BID twenty dollars". The word "BID" can indicate that the speech to follow should be used to fill in the data entry field.

In a similar fashion, the markers associated with the text sections of the visual MLD can specify text labels. Selection of such a marker can indicate that the text label is to be used as a speech label for selecting an audio MLD section counterpart of the underlying visual MLD section. For example, a text label specified by marker 215 can be used as a speech label for selecting associated text 210 or text 220 which can be a subset of the heading text 210.

Figure 3:
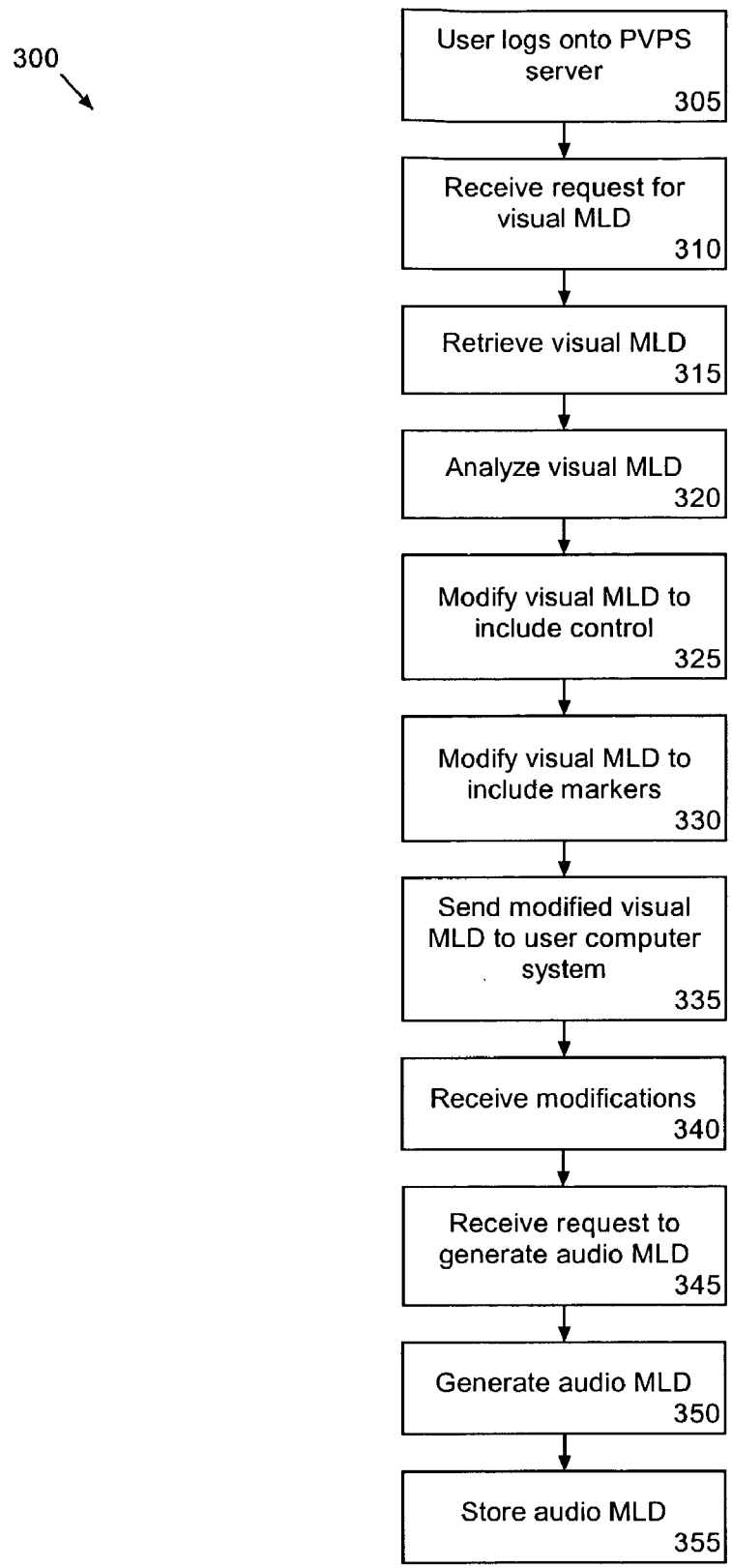
FIG. 3 is a flow chart illustrating a method of voice enabling selected visual content as performed by the system of FIG. 1.

FIG. 3 is a flow chart illustrating a method 300 of voice enabling selected visual content as performed by the system of FIG. 1. The method 300 can begin in step 305 where a user can log on to the PVPS. The user can log on using any of a variety of mechanisms including a username, a unique identifier, a password, or any combination thereof. Those skilled in the art will recognize that additional security measures such as encryption also can be utilized. In step 310, the PVPS can receive a request from a user computer system. The request, for example an HTTP request, can specify a visual MLD such as a Web page to be retrieved over a computer communications network.

In step 315, the PVPS can retrieve the user requested visual MLD. In step 320, the PVPS can begin to analyze the visual MLD. For example, the PVPS can parse the visual MLD and identify the various tags, headings, text, hyperlinks, images, and other data structures specified within the visual MLD. Accordingly, the PVPS can modify the visual MLD to specify a control mechanism for initiating the generation of an audio MLD version of the retrieved visual MLD. For instance, the PVPS can include code and/or tags necessary to render an activatable icon, the selection of which initiates the generation of the audio MLD. The activatable icon can be made to appear anywhere within the visual MLD. In an alternative embodiment of the invention, the various control mechanisms disclosed herein can be included within the browser or within a toolbar add-on to the browser which can be downloaded and/or obtained by logging on to the PVPS.

In step 330, the visual markup language document can be modified to specify markers corresponding to the various sections of the visual MLD that were identified in the analysis step 320. For example, markers can be placed proximate to text sections, headings, data entry fields, hyperlinks, data structures, images, and the like. Selection of one of the markers can indicate to the PVPS that the section of the visual MLD associated with the selected marker is not to be included within the audio MLD version of the visual MLD.

As mentioned, however, different markers can be included within the visual MLD. For example, the markers can specify text labels. The text label specified by the marker can be derived from the tags and/or text of the visual MLD. Selection of such a marker can cause the text label specified by the marker to be used as a speech label in the audio MLD version of the visual MLD. Thus, when the audio MLD is subsequently retrieved by the user, speaking the speech label can select the headline or text selection thereby causing that portion of the audio MLD to be played. Notably, a text label for a heading section can be used as a speech label for text organized beneath the heading section. A text label marker can be assigned to data entry fields as well. In that case, for example, the text associated with the marker can be used as a speech label in the resulting audio MLD to indicate that a user speech input should be used to fill in the data entry field.

In step 335, the modified visual MLD can be sent to the user's computer system where the visual MLD can be presented through a suitable browser. In step 340, the PVPS can receive any user selections with regard to markers for excluding material from the audio MLD as well as markers indicating speech labels to be used to access material in the audio MLD. In step 345, the PVPS can receive a request to generate an audio MLD version of the visual MLD in accordance with the received user selected markers. Accordingly, in step 350, the PVPS can generate the audio MLD and store the resulting audio MLD in step 355. Subsequently, the user can access the audio MLD through a suitable communications device having an audio interface.

The present invention enables users to select, with particularity, which content the user would like to access through an audio interface. In consequence, users can access any desirable online content via a portable communications device. The user need not wait for a third party to make the content available. Importantly, the user gains access to an audio version of the particular content source (i.e. Web page) that the user normally accesses through a visual browser, rather than accessing like information from an alternative and different source. The present invention also enables physically challenged persons to access any desired online content by requesting a visual MLD, initiating the generation of an audio version of the visual MLD, and accessing the content through a more convenient audio interface.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of deriving audio content from visual content comprising:

receiving a request from a client computer system for a visual markup language document served by a Web server;

responsive to the client request, retrieving the visual markup language document from the Web server;

parsing the visual markup language document to identify at least one of text sections, headings, images, selectable icons, hyperlinks, data-entry fields, lists, and tables within the visual markup language document;

modifying the visual markup language document to include a corresponding visual marker for, and adjacent to, each identified text section, heading, image, selectable icon, hyperlink, data-entry field, list, and table for generating an audio markup language document version of the visual markup language document;

modifying said visual markup language document to specify at least one marker specifying a text label, wherein said marker specifying a text label is associated with a field for receiving text in said visual markup language document;

further modifying the visual markup language document to include at least one user-selectable control;

providing said modified visual markup language document to said client computer system for presentation within a visual interface of the client computer system;

receiving an indicator from said client computer system that the at least one user-selectable control was selected;

responsive to a selection of the at least one user-selectable control, generating the audio markup language document version of said visual markup language document;

during said generating step, associating said text label with a section of said audio markup language document corresponding to said field of said visual markup language document;

saving said audio markup language document version for subsequent presentation through an audio interface;

wherein the at least one user-selectable control is a plurality of controls, each control being associated with a subset of content contained within the visual markup language document, and wherein the audio markup language document version includes content associated with a selected one of said controls and does not include content within the visual markup language document associated with unselected ones of said controls; and wherein said associating step renders said text label as a selectable speech label specifying that speech is to be used as an input to said section of said audio markup language document.

2. The method of claim 1, further comprising:

establishing a communication connection with an audio-enabled communication device;

identifying a user of the audio-enabled communication device as the user of the client computer system; and providing content of the previously saved audio markup language document to the audio-enabled communication device upon request.

3. The method of claim 1, further comprising:

during a different communication session from that involving the client computing system, sending said audio markup language document to a communications device having the audio interface.

4. The method of claim 1, wherein the at least one user-selectable control comprises a speech-selectable control responsive to a speech utterance.

5. The method of claim 1, further comprising:

responsive to a selection of at least one visual marker, excluding a portion of said visual markup language document corresponding to an identified text section, heading, image, selectable icon, hyperlink, data-entry field, or predetermined structure of said visual markup language document from said generating step.

6. The method of claim 5, wherein said portion of said visual markup language document corresponds to an image.

7. The method of claim 5, wherein said portion of said visual markup language document corresponds to text.

8. The method of claim 1, further comprising:

during said generating step, associating a text label with a section of said audio markup language document.

9. The method of claim 8, wherein said associating step renders said text label as a selectable speech label for requesting playback of said section of said audio markup language document.

10. A system for audibly presenting user-selected visual Web content comprising:

a Web server configured to serve visual markup language documents to clients via a computer communications network; and a personal voice portal service configured to:

receive a request from a client computer system for a visual markup language document served by said Web server, retrieve the visual markup language document from the Web server in response to the client request, parse the visual markup language document to identify at least one of text sections, headings, images, selectable icons, hyperlinks, data-entry fields, lists, and tables within the visual markup language document, modify the visual markup language document to include a corresponding visual marker for, and adjacent to, each identified text section, heading, image, selectable icon, hyperlink, data-entry field, list, and table for generating an audio markup language document version of the visual markup language document, modify said visual markup language document to specify at least one marker specifying a text label, wherein said marker specifying a text label is associated with a field for receiving text in said visual markup language document, modify the visual markup language document to include at least one user-selectable control, provide said modified visual markup language document to a client computer system for presentation within a visual interface of the client computer system, receive an indicator from said client computer system that the at least one user-selectable control was selected, generate the audio markup language document version of said visual markup language document in response to a selection of the at least one user-selectable control, associate said text label with a section of said audio markup language document corresponding to said field of said visual markup language document when generating the audio markup language document version, save said audio markup language document version for subsequent presentation through an audio interface, wherein the at least one user-selectable control comprises a plurality of controls, each control being associated with a subset of content contained within the visual markup language document, and wherein the audio markup language document version includes content associated with a selected one of said controls and does not include content within the visual markup language document associated with unselected ones of said controls, and wherein said associating said text label renders said text label as a selectable speech label specifying that speech is to be used as an input to said section of said audio markup language document.

11. A computer-readable storage medium, having stored thereon a computer program having a plurality of code sections executable by a computer for causing the computer to perform the steps of:

receiving a request from a client computer system for a visual markup language document served by a Web server;

responsive to the client request, retrieving the visual markup language document from the Web server;

parsing the visual markup language document to identify at least one of text sections, headings, images, selectable icons, hyperlinks, data-entry fields, lists, and tables within the visual markup language document;

modifying the visual markup language document to include a corresponding visual marker for, and adjacent to, each identified text section, heading, image, selectable icon, hyperlink, data-entry field, list, and table for generating an audio markup language document version of the visual markup language document;

modifying said visual markup language document to specify at least one marker specifying a text label, wherein said marker specifying a text label is associated with a field for receiving text in said visual markup language document;

further modifying the visual markup language document to include at least one user-selectable control;

providing said modified visual markup language document to said client computer system for presentation within a visual interface of the client computer system;

receiving an indicator from said client computer system that the at least one user-selectable control was selected;

responsive to a selection of the at least one user-selectable control, generating the audio markup language document version of said visual markup language document;

during said generating step, associating said text label with a section of said audio markup language document corresponding to said field of said visual markup language document;

saving said audio markup language document version for subsequent presentation through an audio interface;

wherein the at least one user-selectable control is a plurality of controls, each control being associated with a subset of content contained within the visual markup language document, and wherein the audio markup language document version includes content associated with a selected one of said controls and does not include content within the visual markup language document associated with unselected ones of said controls; and wherein said associating step renders said text label as a selectable speech label specifying that speech is to be used as an input to said section of said audio markup language document.

12. The computer-readable storage medium of claim 11, further comprising:

establishing a communication connection with an audio-enabled communication device;

identifying a user of the audio-enabled communication device as the user of the client computer system; and providing content of the previously saved audio markup language document to the audio-enabled communication device upon request.

13. The computer-readable storage medium of claim 11, further comprising:

during a different communication session from that involving the client computing system, sending said audio markup language document to a communications device having the audio interface.

14. The computer-readable storage medium of claim 11, wherein the at least one user-selectable control comprises a speech-selectable control response to a speech utterance.

15. The computer-readable storage medium of claim 11, further comprising:

responsive to a selection of at least one visual marker, excluding a portion of said visual markup language document corresponding to an identified text section, heading, image, selectable icon, hyperlink, data-entry field, or predetermined structure of said visual markup language document from said generating step.

16. The computer-readable storage medium of claim 15, wherein said portion of the visual markup document corresponds to an image.

17. The computer-readable storage medium of claim 15, wherein said the portion of the visual markup document corresponds to text.

18. The computer-readable storage medium of claim 11, further comprising:

during the generating step, associating a text label with a section of said audio markup language document.

19. The computer-readable storage medium of claim 18, wherein said associating step renders said text label as a selectable speech label for requesting playback of said section of said audio markup language document.

* * * * *